US005424532A

United States Patent [19]

Occheto et al.

[11] Patent Number: 5,424,532

[45] Date of Patent: Jun. 13, 1995

[54] MULTI-BEAM LIGHT BARRIER WITH MONITORING OF MALFUNCTION

[75] Inventors: Sergio Occheto, Torino; Françesco Mirandola, Collegno, both of Italy

[73] Assignee: Reer S.p.A., Torino, Italy

[21] Appl. No.: 43,098

[22] Filed: Apr. 5, 1993

[30] Foreign Application Priority Data

Apr. 30, 1992 [EP] European Pat. Off. .......... 92830202

[51] Int. Cl.[6] .......... G01V 9/04

[52] U.S. Cl. .......... 250/221; 340/555

[58] Field of Search .......... 250/221, 222.1, 223 R, 250/223 B, 224, 208.2; 340/555

[56] References Cited

U.S. PATENT DOCUMENTS

| | | | |
|---|---|---|---|
| 3,970,846 | 7/1976 | Schofield et al. | 250/221 |
| 4,749,853 | 6/1988 | Salim | 250/221 |
| 5,130,532 | 7/1992 | Clemens | 250/221 |
| 5,146,081 | 9/1992 | Heikkinen et al. | 250/221 |
| 5,243,183 | 9/1993 | Barron, Jr. et al. | 250/221 |
| 5,300,768 | 4/1994 | Wakikaido et al. | 250/221 X |

FOREIGN PATENT DOCUMENTS

| | | | |
|---|---|---|---|
| 0230517 | 8/1987 | European Pat. Off. . | |
| 3939191 | 5/1991 | Germany . | |
| 2023282 | 12/1979 | United Kingdom . | |
| 8907276 | 8/1989 | WIPO . | |

*Primary Examiner*—David C. Nelms
*Assistant Examiner*—John R. Lee
*Attorney, Agent, or Firm*—Guido Modiano; Albert Josif

[57] ABSTRACT

Pulse formers (14) driving respective LEDs (12) are energized by the cells of a shift register (16) which is docked by a clock line (CK), and to whose first cell an initial pulse is applied by a first signal generator (GR). A barrier-end Line (FB) is connected to the output of the shift register and to the input of the first signal generator. The latter resets the shift register cells through a reset line (RS). A plurality of photodiodes (42) facing the LEDs are connected in common to a bus line (BUS) through resistors (47) and electronic switches (44) which are dosed in turn by the cells of a shift register (46) similarly controlled by a second signal generator (GE) in synchronism with the first. The bus line is connected across a voltage supply through resistors (61, 63) and provides a multi-level signal to an evaluator circuit (VAL). The two shift registers, including the associated LEDs or photodiodes, may form blocks connected in cascade.

6 Claims, 2 Drawing Sheets

MULTI-BEAM LIGHT BARRIER WITH MONITORING OF MALFUNCTION

BACKGROUND OF THE INVENTION

This invention is concerned with a multi-beam optoelectronic barrier (or light curtain) using LEDs and photodiodes.

As is known, the optoelectronic barrier is based on the principle of maintaining an infrared light ray or beam across a passage which is to be monitored, and of detecting breaks in the ray in order to deliver a signal that the barrier has been infringed.

Due to their immaterial nature, optoelectronic barriers have the important advantage that they do not put any physical obstacles in the passages which are to be protected or monitored, of reacting at high speed and, due to the use of infrared light, of being invisible. Consequently, they are meeting with increasing favour in different applications, such as: accident prevention equipment for access to tool machines, dangerous environments, etc.; theft prevention equipment or equipment for controlling access to restricted areas; access control for highway toll gates; etc.

An optoelectronic barrier comprises several light-emitting diodes (LEDs) generating rays, usually parallel, and directed to respective photodiodes, for monitoring wide passages with a fine raster, i.e. with detection of breaks even when narrowly localized. It is therefore necessary that each photodiode only reads the ray of its associated LED, and to such end the LEDs are energized in a discrete succession, while the corresponding photodiode is enabled in synchronism. Since the photodiodes may be several tens or hundreds, it is known to convey their output signals to multiplexer circuits controlled by an addressing unit, in order to lead the signal from the instantaneously enabled photodiode to a common evaluating circuit, which analyzes the intensity and/or duration of the received signal.

In consideration of the great diversity of applications Listed above, and of the different number of infrared rays (i.e. of LEDs and photodiodes) installed in different situations, the multiplex and control logic must be designed for each case: this circumstance forces the manufacturer to maintain in production a broad range of versions. Moreover, an optoelectronic barrier, once installed, cannot be mollified, i.e. it cannot be adapted to possible physical changes in the protected area: if, say, the access passage to a tool machine is broadened or reduced, the barrier must be replaced with another version, designed for the new size.

The above-described situation is a source of waste of efforts and time devoted to setting-up, and therefore increases the cost of the barrier, particularly in constantly changing environments such as often are industrial plants.

SUMMARY OF THE INVENTION

A main object of the invention is to provide an optoelectronic barrier having a modular structure, which can be installed in different versions without changes or adaptations in its control circuits, independently of the number of rays forming the barrier.

Another object is to provide such barrier so that the number of its rays can be easily modified, even after installation, without a need for modifying its circuits.

Still another object of the invention is to provide an optoelectronic barrier where monitoring of malfunctions such as simultaneous enabling of several photodiodes and/or LEDs can be implemented without appreciable cost increase.

The invention achieves the above and other objects and advantages, such as will appear from the following disclosure, by providing a an optoelectronic barrier comprising:

a) a plurality of light-emitting units each comprising a plurality of LEDs enabled by respective pulse formers, which are in turn enabled by respective cells of a shift register having an input and an output, an input enabling line connected to the input of said shift register and an output enabling line connected to the output of said shift register, a clock line, a reset line and a barrier-end line, the respective clock lines, reset lines, barrier-end lines and operation check lines being connected in series from one light-emitting unit to the next, the output enabling line of each light-emitting unit being connected to the input enabling line of the next light-emitting unit, and circuit means connecting the output enabling line of the last light-emitting unit to its barrier-end line;

b) signal generating circuits for said light-emitting units, connected to the input enabling line and to the clock, reset and barrier-end lines of the first of said light-emitting units, and adapted to supply a continuous sequence of clock pulses to the clock line, to supply a single pulse to said input enabling line upon an external command, and to supply a single pulse to said reset line upon appearance of a pulse on the barrier-end line of said first light-emitting unit;

c) a plurality of light-receiving units each comprising a plurality of photoreceivers connected to a single bus line through respective connecting members each including an electronic switch, each electronic switch being enabled by respective cells of a shift register having an input and an output, an input enabling line connected to the input of said shift register and an output enabling line connected to the output of said shift register, a clock line, a reset line, and a barrier-end line, the respective clock lines, reset lines, barrier-end lines and bus lines being connected in series from one light-receiving unit to the next, the output enabling line of each light-receiving unit being connected to the input enabling line of the next light-receiving unit, and circuit means connecting the output enabling line of the last light-receiving unit to its barrier-end line;

d) signal generating circuits for said light-receiving units, connected to the input enabling line and to the clock, reset and barrier-end lines of the first of said light-receiving units, and adapted to supply a continuous sequence of clock pulses to said clock line, to supply a single pulse to said input enabling line upon an external command, and to supply a single pulse to said reset line upon appearance of a pulse on the barrier-end line of said first light-receiving unit;

e) an evaluator circuit for evaluating the signals received by the photoreceivers, having an input connected to the bus line of said first light-receiving unit; and f) synchronizing means between said signal generating circuits of the light-receiving units and said signal generating circuits of the light-emitting units.

BRIEF DESCRIPTION OF THE DRAWINGS

The invention will now be disclosed in more detail with reference to a preferred embodiment shown in the attached drawing given by way of illustrative and non-limiting example, and wherein.

DESCRIPTION OF PREFERRED EMBODIMENTS

Figure 1:
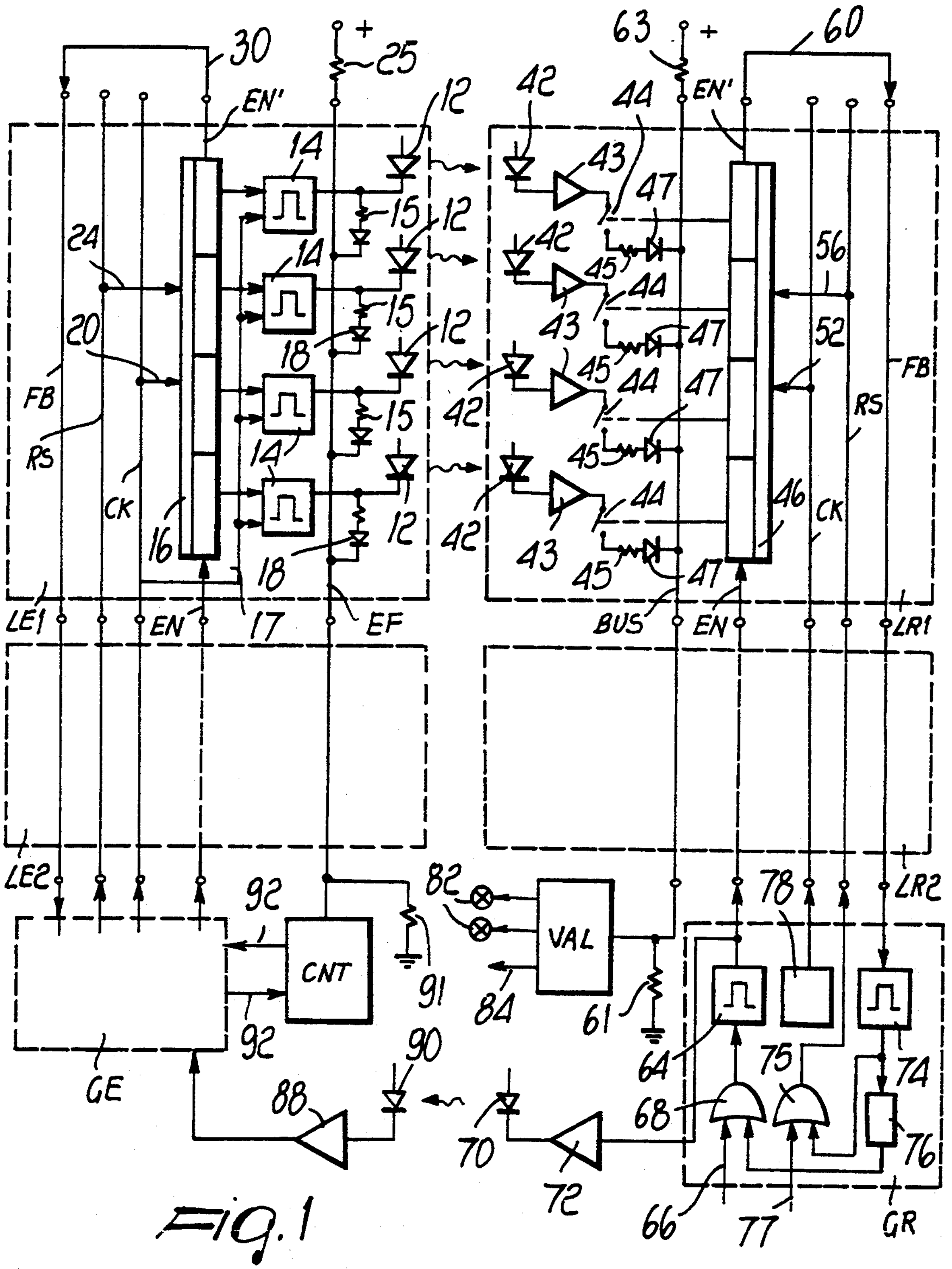
FIG. 1 is a block circuit diagram of the preferred embodiment of an optoelectronic barrier according to the invention.

With reference to FIG. 1, the optoelectronic barrier according to the invention comprises several light-emitting units LE1, LE2 in cascade, corresponding light-receiving units LR1, LR2, also in cascade, a signal generating circuit GR for the light-receiving units, a similar signal generating circuit GE for the light-emitting units, an evaluator circuit VAL of the signals received by the light-receiving units, and a checking circuit CNT monitoring the operation of the light-emitting units.

For the sake of simplicity, only two light-emitting units and two corresponding light-receiving units have been shown, although the barrier according to the invention can comprise an arbitrary number of units in cascade. Moreover, also for the sake of simplicity, units LE2 and LR2 and circuit GE have been only be indicated with a broken-line block, without showing their components, which are intended to be similar to LE1, LE2 and GR.

Light-emitting unit LE1 is a modular block having four light-emitting diodes or LEDs 12, energized by respective pulse formers 14, which are driven by respective cells of a shift register 16 and by a clock signal applied through a line 17. LEDs 12 are focused and aligned as known, so that they generate respective parallel infrared rays.

The input to the first cell of shift register 16 is tied to an input enabling line EN, while the output of its last cell is tied to an output enabling line EN′. Light-emitting unit 10 also includes a clock line CK having opposite terminals, from which are derived both the above clock line 17 to pulse formers 14 and a line 20 to shift register 16 for supplying its docking signal. A reset line RS also goes across light-emitting unit 10 between opposite terminals, and from it is derived a line 24 for leading a reset signal to shift register 16 for resetting its cells. Finally, a barrier-end line FB (the purpose of which will be explained later) also extends between opposite terminals.

The outputs of pulse formers 14 are connected in common to an operation check line EF, through respective coupling members comprising, for each pulse former 14, a resistor 15 in series with a diode 18. The high end of line EF is connected to the high supply voltage through a resistance 25, and its bottom end is connected to ground through a resistance 91.

Finally, a jumper 30 connects the end of output enabling line EN′ to the terminal of barrier-end line FB of light-emitting unit LE1.

It is understood that light-emitting unit LE1 is provided with supply lines and ground lines, not shown in the drawing.

Light-emitting unit LE2 is identical to unit LE1, and a disclosure of it is therefore omitted. Its lines EN, CK, RS and FB are connected to the corresponding lines of light-emitting unit LE1, respectively. The opposite ends of lines EN, CK, RS and FB of unit LE2 are driven by signal generator GE directly.

Light-receiving unit LR1 comprises, similarly to the light-emitting unit, a modular block having four photodiodes 42, driving respective amplifiers 43, whose outputs are connected to respective gate-controlled switches 44; the control electrodes of the latter are driven by respective cells of a shift register 46 having four cells. Gate-controlled switches 44 are connected in common to a common bus line BUS, through respective coupling members comprising, for each switch 44, a resistor 45 and a diode 47. One end of bus line BUS is connected to the high supply voltage through a resistor 63, while its opposite end (on light-receiving unit LR1) is tied to ground via a resistor 61. The junction of bus line BUS with resistor 61 is also connected to the input of evaluator circuit VAL.

Photodiodes 42 are focused and aligned in known manner so that they will receive the respective infrared rays generated by LEDs 12 of the corresponding light-emitting unit LE1.

Similarly to light-emitting unit LE1, light-receiving unit LR1 also comprises an input enabling line EN and an output enabling line EN′ for shift register 46, as well as clock, reset and barrier-end lines CK, RS and FB, respectively, each having opposite terminals. Respective connections 52 and 56 carry clock and reset signals to the appropriate control inputs of shift register 46. A jumper 60 connects the output enabling line EN′ of light-receiving unit LR1 to a terminal of its barrier-end line FB.

Light-receiving unit LR2 is identical to unit LR1, and a disclosure of it is therefore omitted. Its lines EN, CK, RS, FB and BUS are connected to the corresponding lines of light-receiving unit LR1, respectively, while their opposite ends are driven by signal generator GE directly, except for bus line BUS, which goes to evaluator circuit VAL.

Signal generator GR of the light-receiving units comprises: a first monostable multivibrator 64, which can be driven by an external line 66 through an OR gate 68 for supplying an initial pulse to enabling line EN of light-receiving unit LR2, and also to a synchronizing LED 70 via an amplifier 72 for purposes that will be explained later; a second monostable multivibrator 74, whose input is connected to barrier-end line FB of light-receiving unit LR2 and whose output is connected to line RS of the same light-receiving unit through an OR gate 75; a delay circuit 76, receiving the output of the second monostable multivibrator 74 and applies it, with a predetermined delay, to OR gate 68 for driving the first monostable multivibrator 64; an external command line 77 which is connected to a second input of OR gate 75; and finally, a clock generator 78, known per se, which is connected to line CK for supplying it with a uniform succession of clock pulses.

Evaluator circuit VAL is adapted to examine, in succession, the signals coming from bus line BUS (synchronously with the clock signal which it receives through a line not shown). It should be noted that, due to resistors 61 and 63, bus line BUS behaves as a resistive divider, and allows evaluator circuit VAL to receive analog, or multiple-level, signals from the line and to classify the signal levels according to criteria more sophisticated than normally possible in barriers using multiplexing of the photodiode signals. For instance, evaluator circuit VAL can be a window comparator or the like. Therefore, evaluator circuit VAL can establish not only when a ray emitted by a LED 12 has been intercepted, but also if, say, a malfunction is maintaining two or more electronic switches 44 closed, thus causing an abnormal rise of the signal level on bus line BUS. Intercept and malfunction signals are issued on pilot lights such as 82, or on a line 84 leading to further processing. Besides, circuit VAL may be of any known type, including single or many-level comparators, and its description is therefore omitted.

Signal generator GE is similar to signal generator GR, and drives in a similar way the lines EN, C I<, RS and FB of light-emitting unit LE2. It is synchronized, through an amplifier 88, by a photodiode 90, which is optically coupled with LED 70.

The junction of line EF of light-emitting unit LE2 with resistor 91 is tied to the input of an operation checking logic CNT, which verifies that the signals applied to LEDs 12 are normal, in cooperation with signal generator GE through lines 92. Such verification is known in the field, and its description is therefore omitted. However, it should be noted that the analog nature of operation check line EF (similarly to bus line BUS) allows the checking to detect multiple-level changes in the signal.

Figure 2:
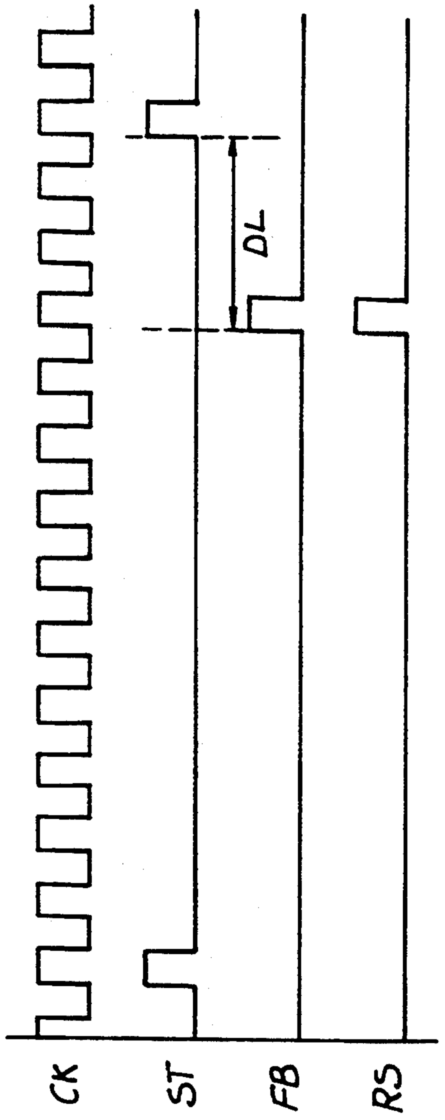
FIG. 2 is a collection of graphs showing certain operative signals of the optoelectronic barrier of FIG. 1.

With reference also to FIG. 2, diagram CK shows the clock signal as continuously generated by signal generator GR, and consisting of a uniform succession of pulses. When an external command is applied to line 66, manually or by command circuits not shown, monostable multivibrator 64 generates a single enabling pulse shown in diagram ST of FIG. 2. This sets the first cell of the shift register of the first light-receiving unit LE2, with consequent closure of the associated electronic switch 43 and energization of the corresponding photodiode 42.

At the same time, LED 70 is also energized to transmit a pulse to photodiode 90, and signal generator GE is driven to apply an identical and synchronous enabling pulse ST on line EN of the first light-receiving unit LR2. The enabled LED 12 therefore emits a light pulse, which may or may not reach the corresponding photodiode 43, depending on whether an obstacle is or is not placed in its path. The signal developed by photodiode 43 is collected on analog bus line BUS and is applied to evaluator circuit VAL for examination.

At the next clock cycle, initial pulse ST is propagated to the next cell of the shift register, both in the light-emitting side and in the light-receiving side. The next LED is therefore energized, and the next photodiode is connected to the bus line BUS through the associated electronic switch 44, while the electronic switch of the preceding photodiode is opened:

The above operative cycle is thus repeated for each cell of the shift registers of the first units LE2 and LR2, and then goes on to the shift registers of units LE1, LR1, eventually reaching the last cells of the shift registers of the last units. The output pulse on the output enabling line of the last light-receiving unit is then propagated to the barrier-end line FB through jumper 60, and drives monostable multivibrator 74 (diagram FB of FIG. 2), which immediately applies a pulse to reset line RS (diagram RS of FIG. 2). From such line, the reset command for the entire system is simultaneously applied to all the shift registers of all the light-receiving units in cascade. The pulse generated by monostable multivibrator 74 is also delayed of a delay time DL in delay circuit 76, and is applied (diagram ST of FIG. 2) to OR gate 68, from which the entire cycle is restarted.

The same operation is repeated in the same time for the light-emitting side, due to the return taking place over jumper 30. At each new start, signal generator GE is also resynchronized through optoelectronic coupling 70, 90. A command pulse can be applied on line 77 to reset the system at any time, thus stopping the operation of the barrier.

For the sake of simplicity, the above disclosure and illustration has ignored the propagation delays of the signals in the several circuits, and consequently also the means and the circuital techniques for maintaining synchronization among the different parts of the system notwithstanding such delays. For the person skilled in the field, the implementation of such techniques is obvious, once the principles of the invention as disclosed above have been learned.

It is understood that the light-emitting and the light-receiving units might be more than two, and in fact their number can be changed at will without having to modify the control circuits, because the ray scanning continues automatically down to the last ray, the signaling of the barrier end also being automatic.

Although the light-emitting and the light-receiving units shown each comprise four LEDs or four photodiodes respectively, with an equal number of cells in the associated shift register, in practice each unit could comprise a different number of LEDs or photodiodes, e.g. ten or more, the shift registers comprising an identical number of cells. Such number, moreover, is not necessarily the same in each unit, as in fact modules of different sizes could be provided, for a greater flexibility in the assembly of the desired barrier. It has been shown above that the operation is independent of the number of units connected in cascade.

The optical coupling for synchronization between the light-receiving side and the light-emitting side might be replaced by a cabled connection. Moreover, it should be understood that the control circuits such as signal generators GR and GE have been shown by way of example only: their operation might be obtained by other implementations, including a microprocessor programmed to generate the cycle described, possibly with incorporation of other accessory functions such as safety procedures, automatic data collection, etc., which have not been described here for the sake of simplicity and because they are outside the scope of the invention.

We claim:

1. A light barrier comprising:

a row of light-emitters connected to the outputs of respective pulse formers;

a row of light-receivers connected to the inputs of respective gate-controlled switches having respective outputs;

a first driving circuit and a second driving circuit which are synchronized together for respectively enabling successive pairs of one pulse former and one corresponding gate-controlled switch; and processing means driven by the outputs of the gate-controlled switches for detecting the presence of an output signal from the corresponding light-receivers;

wherein the light barrier further comprises an operation check line consisting of a resistive voltage divider having its opposite ends respectively connected to a first and to a second fixed voltage, and wherein the outputs of the pulse formers are connected to a middle node of the voltage divider through respective coupling members, the middle node of the voltage divider being further connected to an evaluator circuit for analog evaluation of the voltage on said middle node of the voltage divider.

2. The light barrier of claim 1, wherein each of the coupling members comprises a resistive member.

3. The light barrier of claim 2, wherein each of the coupling members comprises a resistor and diode in series.

4. A light barrier comprising:

a row of light-emitters connected to the outputs of respective pulse formers;

a row of light-receivers connected to the inputs of respective gate-controlled switches having respective outputs;

a first driving circuit and a second driving circuit which are synchronized together for respectively enabling successive pairs of one pulse former and one corresponding gate-controlled switch; and processing means driven by the outputs of the gate-controlled switches for detecting the presence of an output signal from the corresponding light-receivers;

wherein the light barrier further comprises an operation check line consisting of a resistive voltage divider having its opposite ends respectively connected to a first and to a second fixed voltage through respective resistors, and wherein the outputs of the gate-controlled switches are connected to a middle node of the voltage divider through respective coupling members, the middle node of the voltage divider being further connected to an operation checking circuit for analog evaluation of the voltage on said middle node of the voltage divider.

5. The light barrier of claim 4, wherein each of the coupling members comprises a resistive member.

6. The light barrier of claim 5, wherein each of the coupling members comprises a resistor and diode in series.

* * * * *

UNITED STATES PATENT AND TRADEMARK OFFICE

CERTIFICATE OF CORRECTION

PATENT NO. : 5,424,532

DATED : June 13, 1995

INVENTOR(S) : Serfio OCCHETTO ET AL.

It is certified that error appears in the above-indentified patent and that said Letters Patent is hereby corrected as shown below:

On the Title page, item [19], "OCCHETO ET AL." should read --OCCHETTO et al."--.

and in box (75) the name of the Inventors "Sergio Occheto, Torino; Françesco Mirandola, Collegno" should read --Sergio Occhetto, Torino; Francesco Mirandola, Collegno--.

Signed and Sealed this

Fifteenth Day of August, 1995

Attest:

Bruce Lehman

BRUCE LEHMAN

Attesting Officer

*Commissioner of Patents and Trademarks*